April 17, 1962 A. N. T. ST. JOHN ET AL 3,030,253
METHOD OF ASSEMBLING A FLANGE TO A
LAMINATED NON-METALLIC PIPE
Filed March 9, 1959
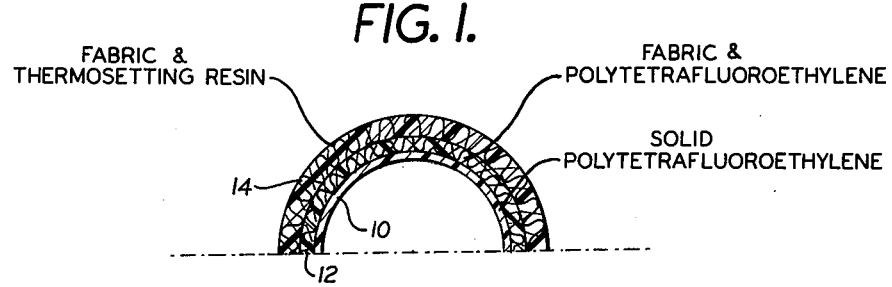
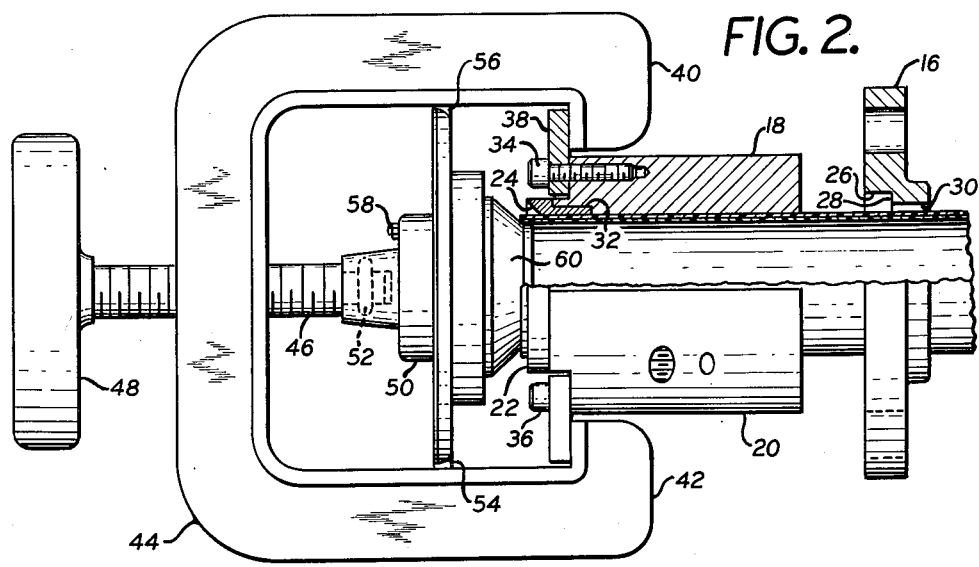
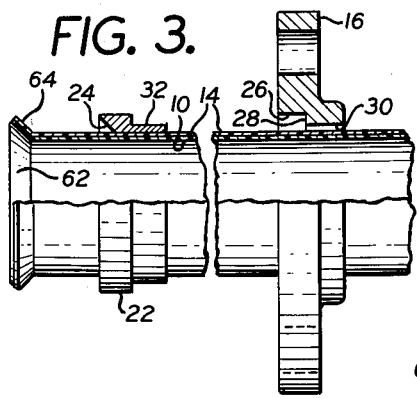
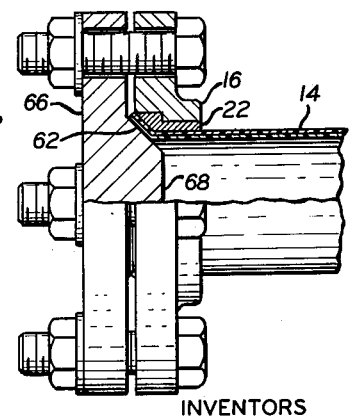
INVENTORS
ALEXANDER N. T. ST. JOHN
ROBERT THOMANN, JR.
WILLIAM E. TITTERTON
BY
Byerly, Townsend, Watson & Churchill
ATTORNEYS.

United States Patent Office 3,030,253
Patented Apr. 17, 1962

3,030,253
METHOD OF ASSEMBLING A FLANGE TO A LAMINATED NON-METALLIC PIPE
Alexander N. T. St. John, Glen Ridge, Robert Thomann, Jr., Teaneck, and William E. Titterton, Whippany, N.J., assignors to Resistoflex Corporation, Roseland, N.J., a corporation of New York
Filed Mar. 9, 1959, Ser. No. 798,060
10 Claims. (Cl. 156—196)

The present invention relates to laminated pipe and more particularly to a method of assembling a flange to a laminated pipe.

In the co-pending application of Alexander N. T. St. John and Benjamin M. Walker, Serial No. 633,728, filed January 11, 1957, there is disclosed and claimed a thermosetting resin-fabric tube with an integral lining of polytetrafluoroethylene resin (hereinafter abbreviated P.T.F.E.), the latter having been prepared from extruded resin, as well as its method of manufacture. A pipe with the foregoing construction is both chemically inert and structurally sound. As a consequence, it is admirably suited for use by the chemical and pharmaceutical industries as well as by the food processing industries and many others.

As described in the foregoing application, the finished pipe consists of a lining of solid P.T.F.E., which may or may not contain reinforcing layers of fabric, bonded to a tube of thermosetting resin which is reinforced with layers of fabric, preferably glass fabric. In order to render the pipe compatible with existing standard plumbing it is necessary to provide the ends with standard bolt flanges and the like. However, for maximum versatility it is desirable that some convenient method be provided for assembling such flanges in the field whereby pipe can be cut and flanged as needed to the exact lengths required.

It is, therefore, an object of the present invention to provide a simple, economical and convenient method for assembling a flange to a laminated pipe of the foregoing type.

In accordance with the invention, there is provided a method of assembling a flange to a laminated pipe having a wall including a layer of polytetrafluoroethylene and a layer of cured thermosetting resin which comprises the steps of applying heat to the end of the laminated pipe until the the thermosetting resin adjacent said end has begun to break down and deteriorate, thereafter flaring radially outwardly said end of the pipe in a manner to mold the polytetrafluoroethylene layer, reconstituting the thermosetting resin layer in the flared portion by impregnating the exposed portions thereof with a compatible resinous cement, and disposing a flanged member behind the flared end of the pipe.

The invention will be better understood after reading the following detailed description with reference to the appended drawings in which:

FIG. 1 is a diagrammatic representation in the form of a transverse half section of a length of pipe of the type under discussion;

FIG. 2 is an elevational view partly in section showing a flaring tool in operative relation to the end of the laminated pipe for the purpose of illustrating a step in the method;

FIG. 3 is a longitudinal view partly in section showing the pipe after the end has been flared but prior to the application of the cement;

FIG. 4 is a longitudinal view partly in section showing the bonding of a back-up ring with an internal conical seat to the back of the flared portion of the pipe; and FIG. 5 is a longitudinal view partly in section showing the completed assembly with a flanged member in place.

Referring to FIG. 1, a section of the laminated pipe is shown having an inner lining 10 of solid P.T.F.E., an intermediate layer 12 of P.T.F.E. reinforced with fabric such as glass fabric, and an outer layer 14 of thermosetting resin, preferably an epoxy resin, likewise reinforced with fabric.

As a preparatory step in the assembly of the flange, the pipe is cut to the desired length being certain to obtain a clean square cut. This can be accomplished with a hack saw and a miter box, or in any other convenient manner.

After the pipe is cut it is recommended that the frayed edges be removed with a suitable grade sand paper or the like. The removal of these edges will prevent the P.T.F.E. lining 10 from becoming damaged during the ensuing flaring operation.

With the pipe end prepared, a bolt flange or flange plate 16 is disposed over the pipe as shown in FIG. 2. Next, a collar which has been split longitudinally to provide two halves 18 and 20 is secured about the end of the pipe spaced a sufficient distance from the end to receive a metal back-up ring 22 having an internal conical seat 24 and still allow room for flaring the end of the pipe in the manner yet to be described. The halves 18 and 20 of the collar may be joined together in any convenient manner, such as by suitable bolts and guide pins. The internal diameter of the collar should be such that a tight grip can be obtained about the laminated pipe.

The flange 16 is provided with a central bore having a forward portion 26 of increased diameter to provide a shoulder 28. The rearward end of the bore at 30 has a diameter which is less than that of the portion 26 but greater than the outside diameter of the pipe. The back-up ring 22 has its outer surface 32 similarly shaped such that it can make a slip fit with the bore in the flange 16.

Secured to the sections 18 and 20 of the collar by bolts 34 and 36 is an annular plate 38. This plate is for the purpose of providing a purchase for the fingers 40 and 42 of the frame 44. A threaded stem 46 is threadedly mounted in the rear of the frame 44. A hand wheel 48 is secured to the outer end of the stem 46 for rotating the latter. The other end of the stem 46 is journalled in the back of an electrically heated conical flaring tool 50 which it both supports and axially positions. A ring and groove fastening arrangement 52 can be used to secure the stem 46 to the tool 50. Lateral extensions or ears 54 and 56 prevent rotation of the tool 50 relative to the frame 44, while the nut 58 symbolizes one of two binding posts for connection to a source of electricity. It is to be understood that the slope of the conical face 60 of the flaring tool 50 is the same as that of the conical seat 24 on the back-up ring. It should also be understood that an electrical heater can be installed in the tool 50 in any well known manner.

With the parts assembled as shown in FIG. 2, the heater in the flaring tool is energized. At this time the conical face 60 of the tool should be in contact with the edge of the laminated pipe. The capacity of the heater for the tool should be sufficient to raise the surface temperature of the tool to 500° F. With pipe up to the 2 inch size, the heat from the tool 50 should be adequate within a reasonable period of time to raise the temperature of the end of the pipe to between 300° and 400° F. or whatever temperature is required to break down and start deterioration of the thermosetting resin in the outer layer 14. With pipe of larger diameter it will, from a practical standpoint, be advisable to apply additional heat externally to the pipe. Additional heat may also be applied beneficially with the smaller size pipes to accelerate the breakdown process. The heat can be applied with a hot air heat gun or with an auxiliary hinged heating collar positioned over the part to be flared, or in any other suitable manner.

In order to permit the flare to form with minimum stress on the reinforcing fibers or fabric it is important that the strength of the thermosetting resin in the vicinity of the flare be destroyed.

When it is determined or estimated that the end of the pipe is ready for flaring, the hand wheel 48 is rotated slightly to advance the flaring tool 50 and apply a small amount of pressure. If the pipe is showing too much resistance it is probably not up to temperature. The entire flaring operation should take no more than a slight amount of exertion on the hand wheel 48.

If the thermosetting resin is properly deteriorated, the layer 14 will offer little resistance to the flaring operation. At 500° F. the P.T.F.E. layers 10 and 12 can be readily flared and molded. With the tool 50 advanced sufficiently to compress the end of the pipe against the seat 24 of the back-up ring, the heater or heaters are turned off and the assembly is allowed to cool. If desired cooling can be accelerated by the application of water or the like. The flaring operation is now complete and both the flaring tool 50 and the collar sections 18 and 20 can be removed.

The condition of the pipe will now be as shown in FIG. 3 with the back-up ring 22 backed away from the flared section 62 of the pipe. At this point the back of the flare 64 is splayed and cracked.

A compatible resinous cement is now applied to the area 64 to reimpregnate or reconstitute the layer 14. If the thermosetting resin in layer 14 is an epoxy, then an appropriate epoxy mixture can be brushed on in known manner. Care should be taken to completely saturate the exposed fibers.

Next a film of a release agent, suitable for the particular cement involved, is applied to the outer surface of the back-up ring as well as the bore of the flange 16. Care should be taken that none of the release agent gets on the forward face of the back-up ring or on its conical seat 24.

Having prepared the parts in the manner described, a special flange 66 with a conical pilot or boss 68 is bolted to the flange 16 with just enough pressure, as shown in FIG. 4, to bring the back-up ring 22 in intimate contact with the rear of the flare 62. Care must be taken to be sure the ring 22 is normal to the axis of the pipe.

After an appropriate setting time, say 20 to 25 minutes for an epoxy composition, the flange 66 can be removed leaving the finished assembly as seen in FIG. 5. It will be understood that due to the presence of the releasing agent the flange 16 can be separated from or rotated about the ring 22. This is desirable, for example, to simplify the problem of aligning bolt holes in the flanges and so forth.

Having described in detail the presently preferred method of practicing the subject invention, it is to be understood that changes may be made therein as will appear to those skilled in the art without departing from the true spirit of the invention as defined in the appended claims.

What we claim is:

1. Method of assembling a flange to a laminated pipe having a wall including a layer of polyetrafluoroethylene and a layer of cured thermosetting resin which comprises the steps of applying heat to the end of the laminated pipe until the thermosetting resin adjacent said end has begun to break down and deteriorate, thereafter flaring radially outwardly said end of the pipe in a manner to mold the polytetrafluoroethylene layer, reconstituting the thermosetting resin layer in the flared portion by impregnating the exposed portions thereof with a compatible resinous cement, and disposing a flanged member behind the flared end of the pipe.

2. Method of assembling a flange to a laminated pipe having a wall including a layer of polytetrafluoroethylene and a layer of a cured thermosetting resin which comprises the steps of applying heat to the end of the laminated pipe until the thermosetting resin adjacent said end has begun to break down and deteriorate, thereafter urging a conical flaring tool against the heated end of the pipe until a desired outwardly directed flare is produced while the tool is maintained at an elevated temperature sufficient to form the polytetrafluoroethylene, maintaining the flaring tool in forming engagement with the pipe end while enabling the pipe end to cool sufficiently for the polytetrafluoroethylene to retain its flared shape in the absence of forming pressure, removing the flaring tool, reconstituting the thermosetting resin layer in the flared portion by impregnating the exposed portions thereof with a compatible resinous cement, and disposing a flanged member behind the flared end of the pipe.

3. Method of assembling a flange to a laminated pipe having a wall including a layer of polytetrafluoroethylene and a layer of cured thermosetting resin which comprises the steps of applying heat to the end of the laminated pipe until the thermosetting resin adjacent said end has begun to break down and deteriorate, thereafter flaring radially outwardly said end of the pipe in a manner to mold the polytetrafluoroethylene layer, reconstituting the thermosetting resin layer in the flared portion by impregnating the exposed portions thereof with a compatible resinous cement, reinforcing the flared portion by bringing a back-up ring with an internal conical seat into intimate contact with the cement before it has set, and disposing a flanged member behind the back-up ring.

4. Method of assembling a flange to a laminated pipe having a wall including an inner layer of solid polytetrafluoroethylene and an outer layer of fibers bonded together with a cured thermosetting resin which comprises the steps of disposing on the pipe near an end a back-up ring having an internal conical seat, applying heat to the end of the laminated pipe until the thermosetting resin adjacent said end has begun to break down and deteriorate, thereafter flaring said end of the pipe outwardly against the conical seat of the back-up ring in a manner to mold the polytetrafluoroethylene layer, separating said back-up ring from the flared end of the pipe, applying a compatible resinous cement to the outer surface of the flared end of the pipe to reconstitute the bond between the fibers in the outer layer, bringing the back-up ring into intimate contact with the cement before it has set thereby providing a reinforced pipe end, and disposing a flanged member behind the back-up ring.

5. Method of assembling a flange to a laminated pipe having a wall including an inner layer of solid polytetrafluoroethylene and an outer layer of fibers bonded together with a cured thermosetting resin which comprises the steps of disposing on the pipe near an end a back-up ring having an internal conical seat, applying heat to the end of the laminated pipe until the thermosetting resin adjacent said end has begun to break down and deteriorate, applying pressure against the heated end of the pipe to flare the end outwardly against the conical seat of the back-up ring while applying heat to the end of the pipe sufficient to form the polytetrafluoroethylene, maintaining said pressure while enabling the pipe end to cool sufficiently for the polytetrafluoroethylene to retain its flared shape in the absence of forming pressure, removing said pressure, separating said back-up ring from the flared end of the pipe, applying a compatible resinous cement to the outer surface of the flared end of the pipe to reconstitute the bond between the fibers in the outer layer, bringing the back-up ring and flared pipe end into intimate contact to cement the two together thereby providing a reinforced pipe end, and disposing a flanged member behind the back-up ring.

6. Method of assembling an end fitting to a laminated pipe having a wall including a layer of polytetrafluoroethylene and a layer of cured thermosetting resin which comprises the steps of applying heat to the end of the laminated pipe until the thermosetting resin adjacent said end has begun to break down and deteriorate thereafter flaring radially outwardly said end of the pipe in a manner to mold the polytetrafluoroethylene layer, and securing a fitting member to the flared end of the pipe.

7. Method of assembling an end fitting to a laminated pipe having a wall including a layer of polytetrafluoroethylene and a layer of cured thermosetting resin which comprises the steps of applying heat to the end of the laminated pipe until the thermosetting resin adjacent said end has begun to break down and deteriorate, thereafter flaring radially outwardly said end of the pipe in a manner to mold the polytetrafluoroethylene layer, reconstituting the thermosetting resin layer in the flared portion by impregnating the exposed portions thereof with a compatible resinous cement, and securing a fitting member to the flared end of the pipe.

8. Method of assembling a flange to a laminated pipe having a wall including a layer of polytetrafluoroethylene and a layer of cured thermosetting resin which comprises the steps of applying heat to the end of the laminated pipe until the thermosetting resin adjacent said end has begun to break down and deteriorate, thereafter flaring radially outwardly said end of the pipe in a manner to mold the polytetrafluoroethylene layer, and securing a flanged member to the flared end of the pipe.

9. Method of assembling a flange to a laminated pipe having a wall including a layer of polytetrafluoroethylene and a layer of cured thermosetting resin which comprises the steps of applying heat to the end of the laminated pipe until the thermosetting resin adjacent said end has begun to break down and deteriorate, thereafter flaring radially outwardly said end of the pipe in a manner to mold the polytetrafluoroethylene layer, reconstituting the thermosetting resin layer in the flared portion by impregnating the exposed portions thereof with a compatible resinous cement, and securing a flanged member to the flared end of the pipe.

10. Method of assembling a flange to a laminated pipe having a wall including a layer of polytetrafluoroethylene and a layer of cured thermosetting resin which comprises the steps of applying heat to the end of the laminated pipe until the thermosetting resin adjacent said end has begun to break down and deteriorate, thereafter flaring radially outwardly said end of the pipe in a manner to mold the polytetrafluoroethylene layer, and disposing a flanged member behind the flared end of the pipe.

References Cited in the file of this patent

UNITED STATES PATENTS

| | | |
|---|---|---|
| 2,415,472 | Dorman | Feb. 11, 1947 |
| 2,433,546 | Cornelius | Dec. 30, 1947 |
| 2,545,263 | Corydon | Mar. 13, 1951 |
| 2,608,501 | Kimble | Aug. 26, 1952 |
| 2,632,942 | Berg | Mar. 31, 1953 |

FOREIGN PATENTS

| | | |
|---|---|---|
| 523,450 | Belgium | Oct. 31, 1953 |